J. L. GISH.
SANITARY FLUSHING TANK.
APPLICATION FILED APR. 1, 1915.
1,147,935.
Patented July 27, 1915.
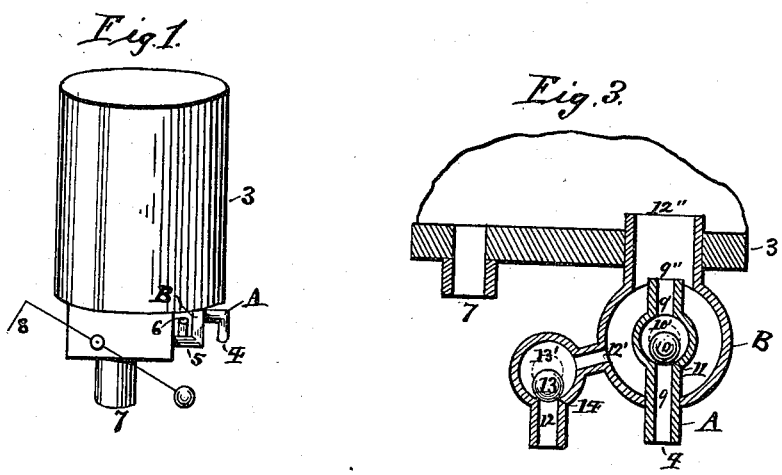
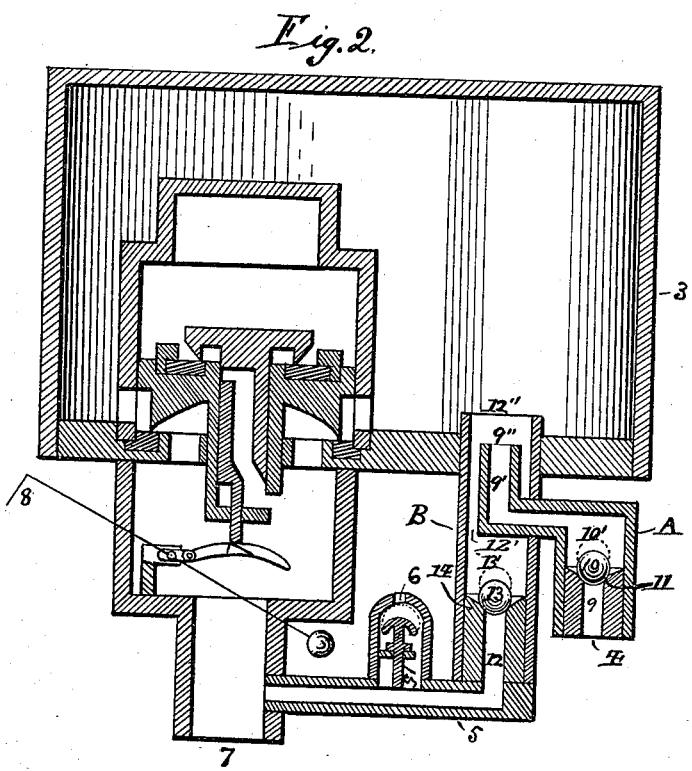

UNITED STATES PATENT OFFICE.

JOHN LINCOLN GISH, OF SOUTH BEND, INDIANA.

SANITARY FLUSHING-TANK.

1,147,935.  Specification of Letters Patent.  Patented July 27, 1915.

Application filed April 1, 1915. Serial No. 18,578.

*To all whom it may concern:*

Be it known that I, JOHN LINCOLN GISH, a citizen of the United States, residing at South Bend, in the county of St. Joseph and State of Indiana, have invented a new and useful Sanitary Flushing-Tank, of which the following is a specification.

The object of my present invention is to provide, tight flushing tanks, with an air and water supplying device, in the form and nature of a double injector, whereby the tight flushing tank, is filled and refilled, within the shortest period of time, and the tank, properly vented, with the lowest pressure of water, and whereby the tank is automatically vented, in case extreme rarefaction of air in tank has been produced, by any cause, and thereby insuring a proper flushing and reflushing, under all conditions.

Figure 1, is a perspective of my improved apparatus. Fig. 2, is a vertical section thereof, showing sectional detail of a tight flushing tank, provided with a regulated self closing valve, and further provided, with an air and water supplying device, in the form of a double injector. Fig. 3, shows one of the modified forms of the double injector.

Like letters and figures, of reference, refer to like parts, in the several figures.

In Fig. 1,—3, is a tight flushing tank. 4, is the water inlet, by way of the double injector (A, and B,) to tank 3. 5, is a drainage pipe leading from the double injector (A, and B,) and joining any suitable discharge way. 6, is an auxiliary air inlet to pipe 5. 7, is the flush pipe from tank 3. 8, is a handle to open any suitable valve placed at the outlet opening from tank 3. The usual connections with the service pipe and the discharge pipe are made at 4, and 7, respectively.

In Fig. 2,—3, is the tank. A, and B, form the double injector. A, is the water supply part, of the injector (A, and B.) A, is arranged within, the air supply part B, of the injector (A, and B.) A, is provided with a water passage-way 9, 9′, throughout. A, is provided with a self closing check valve 10, opening inwardly, said valve 10, is provided with its valve seat 11. B, is the air supply part, of the double injector (A, and B.) B, is arranged on the outside, of water supply part A, of the injector (A, and B.) B, is provided with an air passage-way 12, 12′, throughout. B, is provided with a self closing check valve 13, opening inwardly. Said valve 13, is provided with its valve seat 14. 5, is a drainage pipe leading from the air supply part B, of the injector (A, and B,) to a discharge way or pipe 7. 6, is an auxiliary air inlet arranged on pipe 5. 15, is a valve, properly housed and arranged, to prevent the egress of water, by way, of the air inlet 6.

In my prior Patent No. 1074711, an air and water supplying device in the form and nature of an aspirator, is fully described. By reversing, the respective inlet openings R, and I, in Patent No. 1074711, I convert the said aspirator, into the form and use of a double injector, which will, by actual tests, inject the required amount of air, into the tank 3, and fill the tank 3, with water, for a proper flushing and reflushing, within the shortest period of time. My improvement therefore, provides tight flushing tanks, with an air and water supplying device, using a double injector, instead of an aspirator, with the highest efficiency.

In operation—the filling and refilling of tank 3, with the required amount of air and water, with the greatest efficiency, for a proper flushing and reflushing is accomplished as follows:—Water is allowed to flow into tank 3, through the water inlet 4. As the water, under pressure, flows past the check valve 10, raising said check valve 10, to position of dotted line 10′, Fig. 2, the water is conducted onward and delivered, to opening 9″, within, the air supplying part B, of the double injector (A, and B.) As the water, under pressure, is projected onward, from opening 9″, through part B, to be delivered into tank 3, through the opening 12″, the well known laws, in physics, governing the operation and the operating of a double injector, are fully established, thereby injecting air, simultaneously, with the injecting of water, into tank 3. During the act, of causing air, to be injected through the opening 12″, simultaneously, with the injecting of water, the valve 13, is opened, to position of dotted line 13′, Fig. 2, by the free inflow of air, necessary, for a proper flushing from tank 3, by the time the tank 3, has received its required amount of water. As soon as the air and water pressure, within the tank 3, equals the water pressure, in the service pipe, the check valve 10, and the check valve 13, will close automatically, as shown in Fig. 2, and the said check valves 10, and 13, will become water sealed, and prevent the contents of tank 3, from escaping, by way, of its respective intake pipes. Also, in this device, if the water pressure, through the double injector (A, and B,) is so low, as not to inject air, with the intake of water, then the device above described, will automatically vent tank 3, by way, of check valve 13, as soon as extreme rarefaction of air in tank 3, has been produced, by the discharging of the contents of the tank 3, thereby securing a properly vented tank, for a proper flushing and reflushing, under all conditions.

What I do claim as my invention and desire to secure by Letters Patent is,—

1. The combination with a tight flushing tank, an air supply pipe leading into said tank below the water level therein, and a water supply pipe arranged, in the air supply pipe, below the water level in the tank, said water supply pipe having an inwardly opening valve arranged in its water passage, said air supply pipe having an inwardly opening valve arranged in its air passage, the outer end of said air passage serving as a drainage outlet, said drainage outlet provided with an auxiliary air inlet, said air inlet provided with a valve, arranged and housed, to prevent the egress of water, through the said air inlet.

2. The combination with a tight flushing tank, an air supply pipe leading into said tank below the water level therein, and a water supply pipe arranged in the air supply pipe below the water level in the tank, said water supply pipe having an inwardly opening valve arranged in its water passage, said air supply pipe having an inwardly opening valve arranged in its air passage, the outer end of said air passage serving as a drainage outlet.

3. The combination with a tight flushing tank, an air supply pipe leading into said tank below the water level therein, and a water supply pipe arranged in the air supply pipe below the water level in the tank, said air supply pipe having an inwardly opening valve arranged in its air passage, the outer end of said air passage serving as a drainage outlet.

4. The combination with a tight flushing tank, an air supply pipe leading into said tank below the water level therein, and a water supply pipe arranged in the air supply pipe, said air supply pipe having an inwardly opening valve arranged in its air passage, below the water level in the tank.

5. The combination with a tight flushing tank, an air supply pipe leading into said tank, and a water supply pipe arranged in the air supply pipe, said air supply pipe having an inwardly opening valve arranged in its air passage.

6. The combination with a tight flushing tank, an air supply pipe leading into said tank below the water level therein, said air supply pipe having an inwardly opening valve arranged in its air passage below water level in the tank.

7. The combination with a tight flushing tank, an air supply pipe leading into said tank below the water level therein, said air supply pipe having an inwardly opening valve arranged, in its air passage, below water level in the tank, the outer end of said air passage serving as a drainage outlet.

8. The combination with a tight flushing tank, an air supply pipe leading into said tank below the water level therein, said air supply pipe having an inwardly opening valve arranged, in its air passage, below water level in the tank, the outer end of said air passage serving as a drainage outlet, said drainage outlet having an auxiliary air inlet, said air inlet having a valve, arranged and housed, to prevent, the egress of water, through the said air inlet.

9. A closed flushing tank having a base provided with an air inlet and a water inlet, tubes connected with said inlets below the water level in the tank, a flush pipe connected outside of the tank to said base, the air supply pipe having an inwardly opening valve arranged in its air passage below the water level in the tank, the outer end of said air passage serving as a drainage outlet, and the water supply pipe arranged in the air supply pipe below the water level in the tank.

In testimony whereof I have signed my name to this specification in the presence of two subscribing witnesses.

JOHN LINCOLN GISH.

Witnesses:
ANNA GISH,
ROBERT B. HILL.

Copies of this patent may be obtained for five cents each, by addressing the "Commissioner of Patents, Washington, D. C."